United States Patent
Winchell et al.

(10) Patent No.: US 12,370,015 B2
(45) Date of Patent: Jul. 29, 2025

(54) MANUFACTURE OF PATIENT-SPECIFIC ORTHODONTIC BRACKETS WITH TOOTH-SPECIFIC BREAKAWAY MECHANISM

(71) Applicant: LightForce Orthodontics, Inc., Burlington, MA (US)

(72) Inventors: Dylan Winchell, Somerville, MA (US); Samuel VanNoy, Somerville, MA (US); Kelsey A. Fafara, Watertown, MA (US); Alfred Charles Griffin, III, Lynnfield, MA (US)

(73) Assignee: LightForce Orthodontics, Inc., Burlington, MA (US)

( * ) Notice: Subject to any disclaimer, the term of this patent is extended or adjusted under 35 U.S.C. 154(b) by 912 days.

(21) Appl. No.: 17/398,611

(22) Filed: Aug. 10, 2021

(65) Prior Publication Data

US 2022/0039917 A1    Feb. 10, 2022

Related U.S. Application Data

(60) Provisional application No. 63/063,536, filed on Aug. 10, 2020.

(51) Int. Cl.
  *A61C 7/00* (2006.01)
  *A61C 7/14* (2006.01)
  (Continued)

(52) U.S. Cl.
  CPC .............. *A61C 7/002* (2013.01); *A61C 7/14* (2013.01); *B33Y 10/00* (2014.12); *B33Y 50/00* (2014.12); *B33Y 70/10* (2020.01); *B33Y 80/00* (2014.12)

(58) Field of Classification Search
  CPC .......... A61C 7/002; A61C 7/14; A61C 7/023; B33Y 10/00; B33Y 50/00; B33Y 70/10;
  (Continued)

(56) References Cited

U.S. PATENT DOCUMENTS 5,366,372 A     11/1994  Hansen et al.
5,439,379 A  *   8/1995  Hansen .................... A61C 7/16
                                                    433/8

(Continued)

FOREIGN PATENT DOCUMENTS

WO    WO 2010/123674 A1    10/2010

OTHER PUBLICATIONS

Extended European Search Report mailed Mar. 4, 2024 for European Application No. 21856567.9.

(Continued)

*Primary Examiner* — Chun Cao
*Assistant Examiner* — Michael Tang
(74) *Attorney, Agent, or Firm* — Wolf, Greenfield & Sacks, P.C.

(57) ABSTRACT

Embodiments may provide improved techniques for creating custom lingual or labial ceramic orthodontic brackets, and which provides the capability for in-office fabrication of such brackets. For example, a method of manufacturing customized ceramic labial/lingual orthodontic brackets by ceramic slurry-based AM may comprise measuring dentition data of a profile of teeth of a patient, based on the dentition data, creating a three dimensional computer-assisted design (3D CAD) model of the patient's teeth using reverse engineering, and saving the 3D CAD model on a computer, designing a 3D CAD bracket structure model for a single labial or lingual bracket structure, importing data related to the 3D CAD bracket structure model into a ceramic slurry-based AM machine, directly producing the bracket (green (Continued)

part) in the ceramic slurry-based AM machine by layer manufacturing, and processing the brackets in a sintering and debinding oven prior to direct use.

20 Claims, 14 Drawing Sheets

(51) Int. Cl.
*B33Y 10/00* (2015.01)
*B33Y 50/00* (2015.01)
*B33Y 70/10* (2020.01)
*B33Y 80/00* (2015.01)

(58) Field of Classification Search
CPC .......... B33Y 80/00; B22F 10/12; B22F 10/14; B22F 2999/00; C04B 35/111; C04B 35/486; C04B 2235/6026; Y02P 10/02
USPC .......................................................... 700/98
See application file for complete search history.

(56) References Cited

U.S. PATENT DOCUMENTS

| | | | |
|---|---|---|---|
| 8,623,264 B2 | 1/2014 | Rohner et al. | |
| 8,690,568 B2 | 4/2014 | Chapoulaud et al. | |
| 8,694,142 B2 | 4/2014 | Yang et al. | |
| 10,241,499 B1* | 3/2019 | Griffin | A61C 7/20 |
| 2008/0138756 A1 | 6/2008 | Lim et al. | |
| 2009/0017411 A1 | 1/2009 | Pospisil et al. | |
| 2010/0129764 A1* | 5/2010 | Pospisil | A61C 7/14 |
| | | | 433/10 |
| 2011/0189623 A1* | 8/2011 | Moon | A61C 7/287 |
| | | | 433/9 |
| 2019/0328493 A1 | 10/2019 | Griffin, III et al. | |
| 2019/0374308 A1 | 12/2019 | Griffin, III et al. | |
| 2022/0350127 A1* | 11/2022 | Huffman | B33Y 10/00 |
| 2023/0225833 A1* | 7/2023 | Boronkay | G05B 19/042 |
| | | | 703/7 |

OTHER PUBLICATIONS

International Search Report and Written Opinion mailed Nov. 16, 2021 in connection with International Application No. PCT/US2021/045379.

International Preliminary Report on Patentability mailed Feb. 23, 2023 in connection with International Application No. PCT/US2021/045379.

* cited by examiner

MANUFACTURE OF PATIENT-SPECIFIC ORTHODONTIC BRACKETS WITH TOOTH-SPECIFIC BREAKAWAY MECHANISM

CROSS-REFERENCE TO RELATED APPLICATIONS

This application claims the benefit under 35 U.S.C. § 119(e) of U.S. Provisional Application Ser. No. 63/063,536, filed Aug. 10, 2020, and titled "MANUFACTURE OF PATIENT-SPECIFIC ORTHODONTIC BRACKETS WITH TOOTH-SPECIFIC BREAKAWAY MECHANISM," which is incorporated herein by reference in its entirety.

BACKGROUND OF THE INVENTION

1. Field of the Invention

An embodiment of present invention relates generally to the manufacturing of ceramic labial/lingual orthodontic brackets for straightening the teeth and correcting malocclusion. More specifically, an embodiment of the invention relates to the methodology of direct manufacture of customized labial/lingual orthodontic brackets by using a ceramic slurry-based additive manufacturing (AM) technology.

2. Description of the Related Art

Orthodontics has been widely adapted in clinics to correct malocclusion and straighten teeth. The traditional method is to adhere preformed brackets onto the teeth and run elastic metal wires of round, square, or rectangular cross-sectional shape through the bracket slots to provide the driving force. The adaptation of the bracket to the individual tooth is performed by filling the gap between the tooth surface and bracket surface with adhesive. This thereby bonds the bracket to the tooth such that the bracket slot, when the teeth are moved to their final position, lies in a near flat (depending on manufacturing accuracy) horizontal plane.

Pre-formed edgewise brackets may have no prescription, requiring adjustment of the archwire. Alternatively, the edgewise brackets may have an idealized prescription of angulation, inclination, or in/out variation for specific teeth in what is referred to as a "straight-wire appliance". Because the bracket pad is typically not custom made for an individual patient's tooth, the clinician is responsible for the bracket placement, which may introduce a source of error, which commonly increases patient visits and overall treatment time. These brackets are typically off-the-shelf products. A misplacement in bonding a bracket to a tooth can be corrected by compensation bends in the wire or by debonding and repositioning of the bracket, both of which increase time and cost. Custom metal lingual brackets are currently available that are fabricated at a central location from 3D scans or impressions of the dentition and mailed back to the clinician and transferred to the patient via indirect bonding. Selective laser melting (SLM) is a 3D AM technique that has been used to create custom metal lingual brackets (for example, see U.S. Pat. No. 8,694,142 B2), but this technique suffers from insufficient resolution and surface finish. While true custom labial brackets have been used, custom positioning of a standard, non-custom bracket can be created via indirect bonding which itself has inherent error within the bracket itself. Many current true custom labial systems (SURESMILE™ Inc.) rely heavily on putting custom bends in the wire based on a 3D scan rather than creating a true straight-wire appliance. For example, U.S. Pat. No. 8,690,568 provides for a method to weld a metal bracket slot to a stock metal bracket base into a custom position, but does not describe a method for creating a custom bracket base or to create an aesthetic, non-metal bracket. These partially custom metal brackets suffer from inaccuracy in slot position and premature debonding due a stock bracket base that doesn't match the tooth morphology, and are unappealing to older patients who prefer to have non-metal brackets for aesthetic concerns.

Ceramic brackets have been commercially available and studied since the 1980s and are a desirable material compared to metal brackets due to their excellent esthetics, resistance to creep, rigidity, biocompatibility, corrosion resistance, stability in the oral environment and non-toxic nature. Ceramic brackets are predominantly manufactured by injection molding, which has manufacturing limitations. For example, it may be difficult or impossible to use injection molding to create undercuts that may enhance a bracket's mechanical bond strength to a tooth adhesive.

Ceramic brackets, unlike metal, do not bend in order to debond but instead the connection between the bracket and the bonding material must be broken. Due to the mechanical properties of ceramic and this debond mechanism, there is a higher risk of enamel damage when debonding a bracket or the bracket could not easily separate from the tooth. In this case a diamond burr is necessary to drill the bracket off the tooth which can create sparks, take a long time, and result in a poor patient and provider experience.

Currently, there are two commercially available ceramic brackets which debond via a controlled fracture along a form of 'stress concentrator' designed to force the bracket to break at a particular location when pressure is applied. LFO's Cloud bracket and 3M's Clarity bracket both use a version of this mechanism to ensure an easy debonding experience. In both of these cases, the stress concentrator is a static shape. However, due to the variety of clinical cases and bracket positions provided by LFO's system, a static shape for the stress concentrator does not provide a consistent debonding experience depending on the thickness (in-out) of the bracket and its exact position on the tooth. This invention allows for a customized stress concentrator which provides a more consistent debonding experience regardless of the bracket in-out, position on the tooth, or overall design. This invention will enable a more consistent experience for all customizations and orthodontists, regardless of their particular methods for bonding, debonding, treatment and patients in general, and is only possible through a process of bracket mass-customization, for which LFO's system is the first.

SUMMARY OF THE INVENTION

An embodiment of the present invention provides improved techniques for creating custom lingual or labial ceramic orthodontic brackets, and which provides the capability for in-office fabrication of such brackets.

An embodiment of the present invention may be used to solve problems occurring in the current manufacturing techniques of straight wire appliance orthodontic brackets. For example, in one embodiment, it may provide a direct manufacturing method of customized lingual/labial brackets by utilizing any number of ceramic slurry-based AM technologies, examples of which may include digital light processing (DLP), laser photopolymerization stereolithography, jet printing (including particle jetting, nanoparticle jetting), layer slurry depositioning (LSD), or laser-induced slip casting. A slurry is defined as inorganic particles dispersed in a liquid, and may be photopolymerizable or may polymerize by other mechanisms. Likewise, similar methods may be used to create metal brackets wherein the inorganic materials in the slurry are metal. Examples of items that may be produced include customized labial/lingual brackets according to individual dental and craniofacial features, which may have a direct tooth-matching fault line/grooves (also referred to as fracture grooves, stress concentrators, or breakaway mechanisms) designed into the bracket. Ceramic slurry-based AM may be performed in a device small enough to comfortably fit in a private orthodontic lab and can currently be obtained at a reasonable price, given the market price and in-office volume for non-custom and custom brackets.

For example, in one embodiment, a method of manufacturing customized ceramic labial/lingual orthodontic brackets by ceramic slurry-based AM may comprise measuring dentition data of a profile of teeth of a patient, based on the dentition data, creating a three dimensional computer-assisted design (3D CAD) model of the patient's teeth using reverse engineering, and saving the 3D CAD model on a computer, designing a 3D CAD bracket structure model for a single labial or lingual bracket structure, importing data related to the 3D CAD bracket structure model into a ceramic slurry-based AM machine, directly producing the bracket (green part) in the ceramic slurry-based AM machine by layer manufacturing, and processing the brackets in a sintering and debinding oven prior to direct use or other post-processing steps related to surface properties.

The 3D CAD bracket structure model may include data representing at least a) the bracket pad (base) that has recesses and/or undercuts into the bonding surface of the bracket, to contact a particular tooth's surfaces, b) fault grooves (also referred to as fracture grooves, stress concentrators, or breakaway mechanisms) that are matched to the patient's teeth to facilitate debonding, c) slots for positioning according to the orthodontic needs of the patient, d) a bracket material, e) the particular tooth's profile, and f) a bracket guide to guide 3-dimensional placement of the bracket onto the tooth.

The ceramic slurry-based AM machine may comprise a molding compartment comprising a platform and a plunger to directly produce the bracket by layer manufacturing, a material compartment, and an LED light source for digital light processing, or a print-head with at least one dispensing nozzle as used in "jet" printing, wherein the bracket is produced by layer manufacturing using slicing software to separate the 3D CAD bracket structure model into layers and to get a horizontal section model for each layer so that a shape of each layer produced by the ceramic slurry-based AM machine is consistent with the 3D CAD structure data. The ceramic slurry-based AM machine may comprise a vat adapted to hold the bracket during manufacturing, a horizontal build platform adapted to be held at a settable height above the vat bottom, an exposure unit, adapted to be controlled for position selective exposure of a surface on the horizontal build platform with an intensity pattern with predetermined geometry, a control unit, adapted to receive the 3D CAD bracket structure model and, using the 3D CAD bracket structure model to polymerize in successive exposure steps layers lying one above the other on the build platform, respectively with predetermined geometry, by controlling the exposure unit, and to adjust, after each exposure step for a layer, a relative position of the build platform to the vat bottom, to build up the object successively in the desired form, which results from the sequence of the layer geometries. The exposure unit may further comprise a laser as a light source, a light beam of which successively scans the exposure area by way of a movable mirror controlled by the control unit.

Directly producing the bracket by layer manufacturing may further comprise an apparatus comprising a vat with an at least partially transparent or translucent formed horizontal bottom, into which light polymerizable material can be filled, a horizontal build platform adapted to be held at a settable height above the vat bottom, an exposure unit adapted to be controlled for position and selective exposure of a surface on the build platform with an intensity pattern with predetermined geometry, comprising a light source refined by micromirrors to more precisely control curing, a control unit adapted for polymerizing in successive exposure steps layers lying one above the other on the build platform, controlling the exposure unit so as to selectively expose a photo-reactive slurry in the vat, adjusting, after each exposure for a layer, a relative position of the build platform to the vat bottom, and building up the bracket successively in the desired form, resulting from the sequence of the layer geometries. The exposure unit may further comprise a laser as a light source, a light beam of which successively scans the exposure area by way of a movable mirror controlled by the control unit.

A scanning accuracy may be less than 0.02 mm. A manufacturing accuracy may be from 1 to about 60 and wherein the accuracy may be achieved by using a between layer additive error compensation method that predicts an amount of polymerization shrinkage. Manufactured layers of the bracket comprise a material selected from the group consisting of high strength oxides, nitrides and carbides ceramics including but not limited to: Aluminum Oxide (Al2O3), Zirconium Oxide (ZrO2), Alumina toughened Zirconia (ATZ), Zirconia-toughened alumina (ZTA), Lithium-disilicate, Leucitesilicate, Nitrides (e.g. SiN4), and may be mono- or polycrystalline ceramic. The smallest length from a bracket pad to slot depth may be from 0.2 mm-3 mm depending on the bracket offset required and desire to reduce the bracket profile for patient comfort.

The 3D CAD model may be saved as an .stl file or other 3D vector file. The thickness of the manufactured layers may be from 5 to 100 micrometers (μm), and the machine may use a X-Y pixel resolution from 5-100 μm. Different curing strategies (CSs) and depths of cure (Cd) may be used. A selection of material for producing layers of the bracket may be based on different force demands. The printed bracket guides may have a single bracket attachment for a single bracket. An adhesive material may be used to hold the bracket on the ceramic archwire. The adhesive material may be sticky wax. Indirect bonding/custom bracket placement may occur via a tray (for example, a silicone based or vacuum formed tray) that carries the said custom ceramic brackets to the ideal tooth location.

The printed brackets may have a metal insert that contacts the archwire in the slot. The printed brackets may be of a traditional twin design or are modified to be self-ligating or active ligating and are designed to accommodate 0.018 in to 0.022 in archwires in the slot, but slot height may vary from 0.018-0.022. The bracket angulation, offsets, torque, and prescription may be determined based on a chosen treatment. The structural properties of the bracket (any location) may be altered to facilitate easier debonding of the bracket following treatment. A part of the bracket may be a pre-formed green ceramic body that functions to decrease the time and complexity of the printed bracket. The method may further comprise producing a bracket guide comprising a rigid ceramic rectangular archwire or other archform that dictates a position of each bracket on a tooth in every plane with at least two occlusal/incisal supports adapted to help place brackets via an indirect bonding system. A part of the bracket that holds or connects the bracket to the tooth surface may be designed based on a surface profile of the tooth. The bracket may have a color that is matched to a color of a tooth to which the bracket is to be attached. The bracket may be clear. The bracket may have a selected color unrelated to a color of a tooth to which the bracket is to be attached.

The ceramic slurry-based AM machine may include a light source that is a laser or LED light source. A light source of the DLP machine may radiate a wavelength between 400 and 500 nm. The DLP machine may include a digital light processing chip as a light modulator. The digital light processing chip may be a micromirror array or an LCD array. Alternatively, the ceramic slurry-based AM machine may use a jet technology whereby a liquid ceramic slurry is jetted onto a build-plate in layers, with or without another jet dispensing non-ceramic support material.

Measuring dentition data may be performed using a CT scanner, intra-oral scanner, a coordinate measuring machine, a laser scanner, or a structured light digitizer. Measuring dentition data may be performed by conducting 3D scanning on a casted or 3D printed teeth model.

The light-polymerizable material may be selected from the group consisting of high strength oxides, nitrides and carbides ceramics including but not limited to: Aluminum Oxide ($Al_2O_3$), Zirconium Oxide (ZrO2), Alumina toughened Zirconia (ATZ), Zirconia-toughened alumina (ZTA), Lithium disilicate, Leucite silicate, Nitrides (e.g. SiN4), and metals. A slot position relative to the tooth may be customized by manufacturing a custom base or by manufacturing a custom slot position where a base is unchanged.

In embodiments, a method of manufacturing customized ceramic labial/lingual orthodontic brackets by ceramic slurry-based AM may comprise measuring dentition data of a profile of teeth of a patient, based on the dentition data, creating a three dimensional computer-assisted design (3D CAD) model of the patient's teeth using reverse engineering, and saving the 3D CAD model on a computer, designing a 3D CAD bracket structure model for a single labial or lingual bracket structure, importing data related to the 3D CAD bracket structure model into a ceramic slurry-based AM machine, and directly producing the bracket by layer manufacturing.

In embodiments, the 3D CAD bracket structure model may include data defining at least one slot adapted to receive an archwire, including data defining a compensation angle for walls of the slot to compensate for shrinkage due to over-polymerization and achieve parallel slot walls. The 3D CAD bracket structure model may include data defining a fracture groove through the bracket. The fracture groove may be adapted so as to fracture upon application of a normal force. The normal force may be applied in at least one of a mesial-distal direction, an occlusal-gingival direction, or to any opposite corners. The fracture groove may be adapted to provide predictable fracture of the bracket upon application of the normal force, enabling debonding of the bracket though a combination of tensile and peeling forces. The combination of tensile and peeling forces may be less than a shear bond strength of a bonded bracket. The normal force may be 10-180 Newtons, inclusive.

In embodiments, the 3D CAD bracket structure model may include data defining a contour of a surface of a base of the bracket. The contour may be adapted to a shape of a tooth to which the bracket is to be bonded. The contour may be further adapted based on at least one of an in/out and offset of the bracket, a tip of the slot, and a torque.

In embodiments, the 3D CAD bracket structure model may include data defining a fracture groove in the base or face (auxiliary slot, or vertical slot) of the bracket. The fracture groove may be in a middle vertical third of the bracket. The fracture groove may include a weakened area including a tooth curved depression occlusal-gingival or mesial-distal direction. The fracture groove may match a contour of the tooth for that portion of the bracket positioning. The fracture groove may be constant in depth from the tooth surface. The fracture groove may have a depth of 0.10 mm to 1.2 mm, inclusive. The fracture groove may vary in depth from the tooth surface. The fracture groove may have a variance in depth of 1-50%, inclusive, of a distance from the tooth surface to the deepest part of fracture groove.

In embodiments, the 3D CAD bracket structure model may include data defining at least some corners of the bracket as being rounded. Gingival corners of the bracket may be rounded. The rounded corners of the bracket may have a radius of curvature of 0.05 to 2.0 mm, inclusive.

In embodiments, the bracket may be adapted to be bonded to the lingual or labial surfaces of a tooth. The bracket may be made of Aluminum Oxide ($Al_2O_3$), Zirconium Oxide (ZrO2), Alumina toughened Zirconia (ATZ), Zirconia-toughened alumina (ZTA), Lithiumdisilicate, Leucitesilicate, Nitrides (e.g. SiN4, Silicon Nitride), and may be mono- or polycrystalline ceramic. The 3D CAD bracket structure model may include data defining a mesial-distal or horizontal slot adapted to receive an archwire, a vertical slot adapted to receive at least a portion of the archwire within a middle third of the bracket, or both. The vertical slot may be further adapted to accept a digitally designed lingual multiloop wire.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

An embodiment of the present invention provides improved techniques for creating custom lingual or labial ceramic orthodontic brackets, and a method of manufacturing a tooth specific fault line in the bracket to facilitate debonding.

Figure 1:
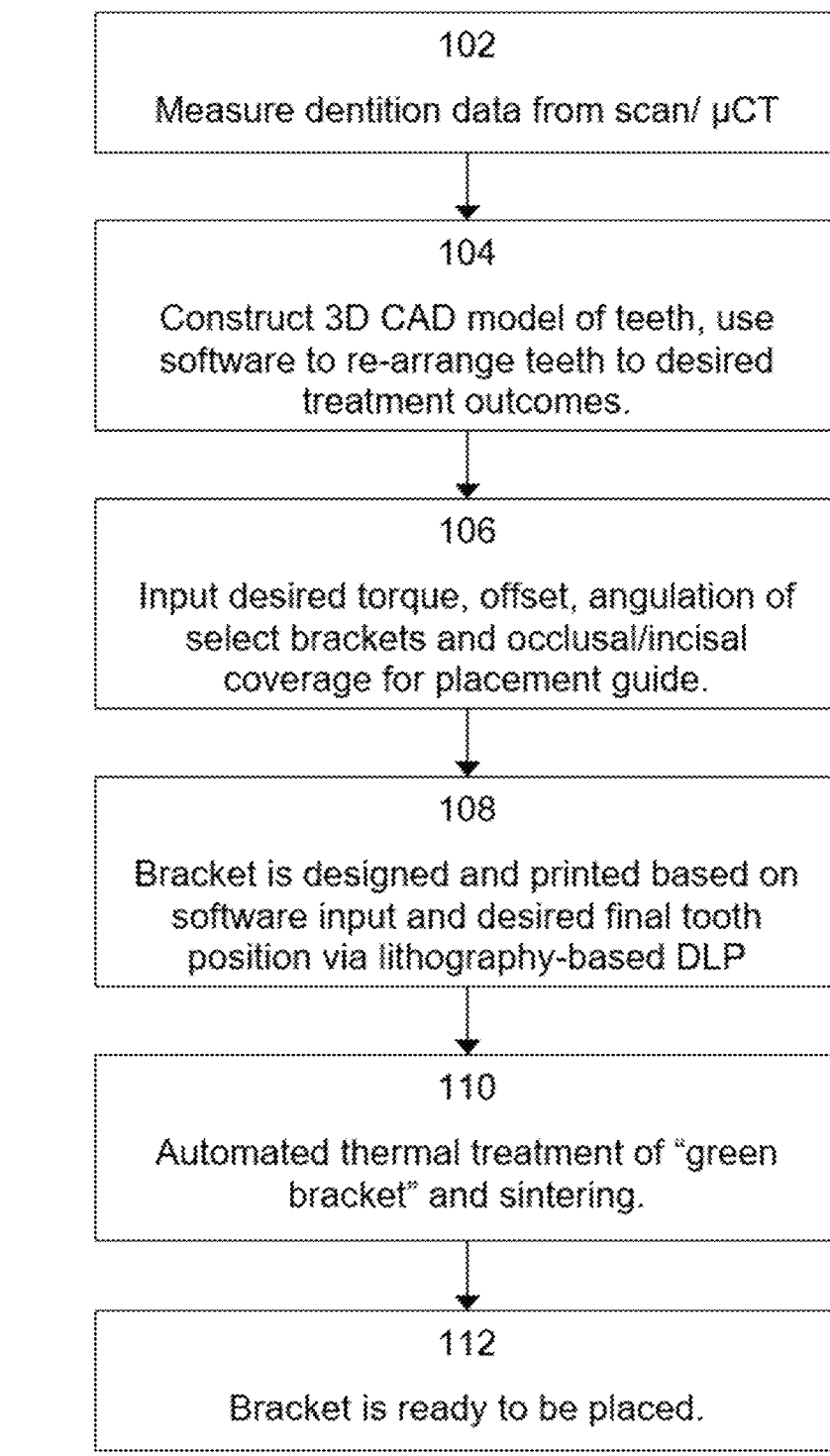
FIG. 1 is an exemplary flow chart of a process for direct manufacturing process 100 of lingual or labial orthodontic brackets.

An exemplary flowchart of an embodiment of a direct manufacturing process 100 of lingual or labial orthodontic brackets by ceramic slurry-based AM is shown in FIG. 1. The process begins with 102, in which dentition data is measured and the parameters of the tooth profile are analyzed. For example, such measurement may use CT layer scanning a non-contact 3D scanner or an intra-oral scanner directly on the patient's teeth, or may use 3D readings on a teeth model previously cast or 3D printed using a coordinate measuring machine, a laser scanner, or structured light digitizers. The scanning accuracy of such techniques is typically less than 0.02 mm.

In 104, based on the given dentition data, a 3D CAD model of the measured teeth is constructed based on the dentition data and saved in the computer in a typical file format, such as the .stl, Additive manufacturing File (AMF) format or any other 3D vector file. The exterior structure of teeth is complicated, usually including irregular curves. The software may then be used to re-arrange the teeth in the model to the desired treatment outcomes that may be based on the long-axis of a tooth.

In 106, additional information, such as the desired torque, offset, angulation of select brackets and occlusal/incisal coverage for placement guide is entered.

In 108, the bracket (or brackets) is designed by the software based on the input 3D CAD model of the measured teeth, the model of the desired treatment outcomes, and the input additional information. The output of the design process may be a 3D CAD model. Such a 3D CAD model may be designed for a single lingual/labial bracket structure, including the bracket guide and bracket pad in contact with teeth surface, as well as the slots for the ideal position according to the orthodontia requirement, ceramic bracket material, and tooth profile.

3D CAD bracket structure models are processed to generate manufacturing control data for use by the production equipment. For example, where the ceramic slurry-based AM equipment is used to produce the brackets, the software slices the 3D CAD bracket structure models to separate it into thin layers and get the horizontal section model for each layer. Based on this section model, the DLP equipment can directly produce ceramic brackets, ensuring the shape of each layer is consistent with the 3D CAD structure data. For example, the thickness of such layers may be about 20 µm to about 50 µm (micrometers or microns) with a manufacturing accuracy of about 5 µm to about 10 µm by using between-layer additive error compensation.

Returning to 108 of FIG. 1, the 3D CAD bracket structure model is transmitted to or imported into a 3D production machine, such as a ceramic slurry-based AM machine and the ceramic brackets are produced DLP is another ceramic additive manufacturing (AM) process that works by stacking layers of a photocurable resin with a ceramic oxides such as Aluminum Oxide ($Al_2O_3$) or Zirconium Oxide ($ZrO_2$), Nitrides or Silicates solid loading, and followed by a thermal debinding and sintering step. The higher resolution of this process is made possible by the LED light's digital mirror device (DMD) chip and optics used. (Stereo-)Lithography-based ceramic manufacturing (LCM) has improved this process making it more accurate with higher resolution (40 µm) and rigidity. The LCM process involves the selective curing of a photosensitive resin containing homogenously dispersed oxide or glass ceramic particles that can be fabricated at very high resolution due to imaging systems which enable the transfer of layer information by means of ever-improving LED technology, though a laser may also be used for photopolymerization.

In 110, post-processing may then be applied. For example, a thermal treatment (for binder burnout) and a sintering process may be applied to achieve optimal or improved ceramic density. For example, the debinding and sintering phase may include removing the green bracket from the device, exposing the blank to a furnace to decompose the polymerized binder (debinding), and sintering of the ceramic material.

The pad (bonding pad) of the bracket may be less than 0.4 mm thick from the tooth. The bracket placement guide may be placed occlusally/incisally to guide the correct placement of the bracket on the tooth. Examples of raw materials of the brackets may include powder of high strength oxide ceramics such as Aluminum Oxide ($Al_2O_3$) and Zirconium Oxide ($ZrO_2$), or other high strength ceramic compositions.

The base of the bracket may be adhered to the tooth surface and the bracket slot may be matched to the archwire. According to requirements of mechanical properties, different composition of material may be required for the layers during the DLP manufacturing process. After being built up, the brackets may have a gradient and better performance.

Further, the bracket surface may be processed based on clinical demand.

At 112, the bracket is ready to be placed.

Typically, the thickness of the bracket pad may be less than 1 mm for lingual brackets and less than 1.5 for labial brackets. Suitable manufacturing materials may include high strength oxides, nitrides and carbides ceramics including but not limited to: Aluminum Oxide (Al2O3), Zirconium Oxide (ZrO2), Alumina-toughened Zirconia (ATZ), Zirconia-toughened alumina (ZTA), Lithiumdisilicate, Leucitesilicate or Silicon Nitride. The bracket pad may be adhered to the tooth surface with well-known dental adhesives. The bracket slot may be matched to the archwire, which may be straight or custom bent. Depending upon the manufacturing process used, different ceramics or composition of powder may be required for the layers. For example, if a selective laser melting manufacturing process is used, an LED light source may be used for the selective curing of a photosensitive resin containing the oxide or glass ceramic particles. Different layers may use different ceramics or compositions of powder.

Figure 2:
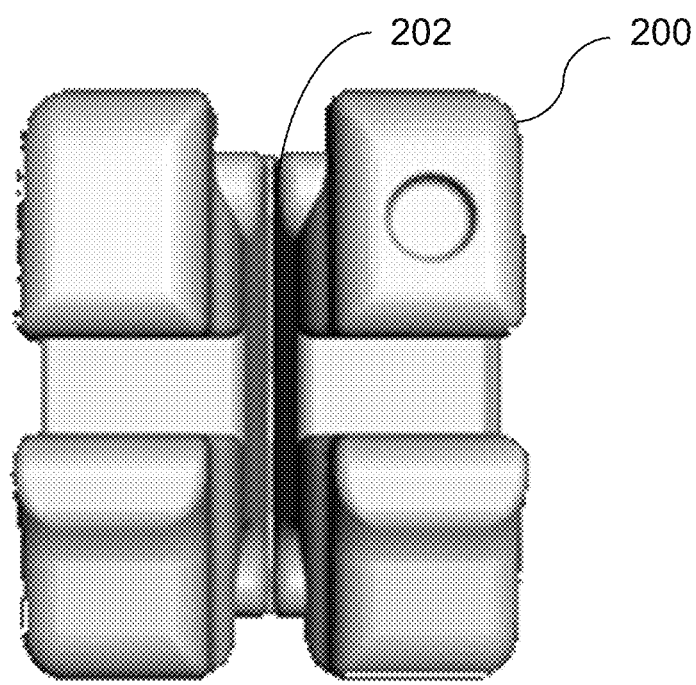
FIG. 2 is an exemplary illustration of an orthodontic bracket.
Figure 3:
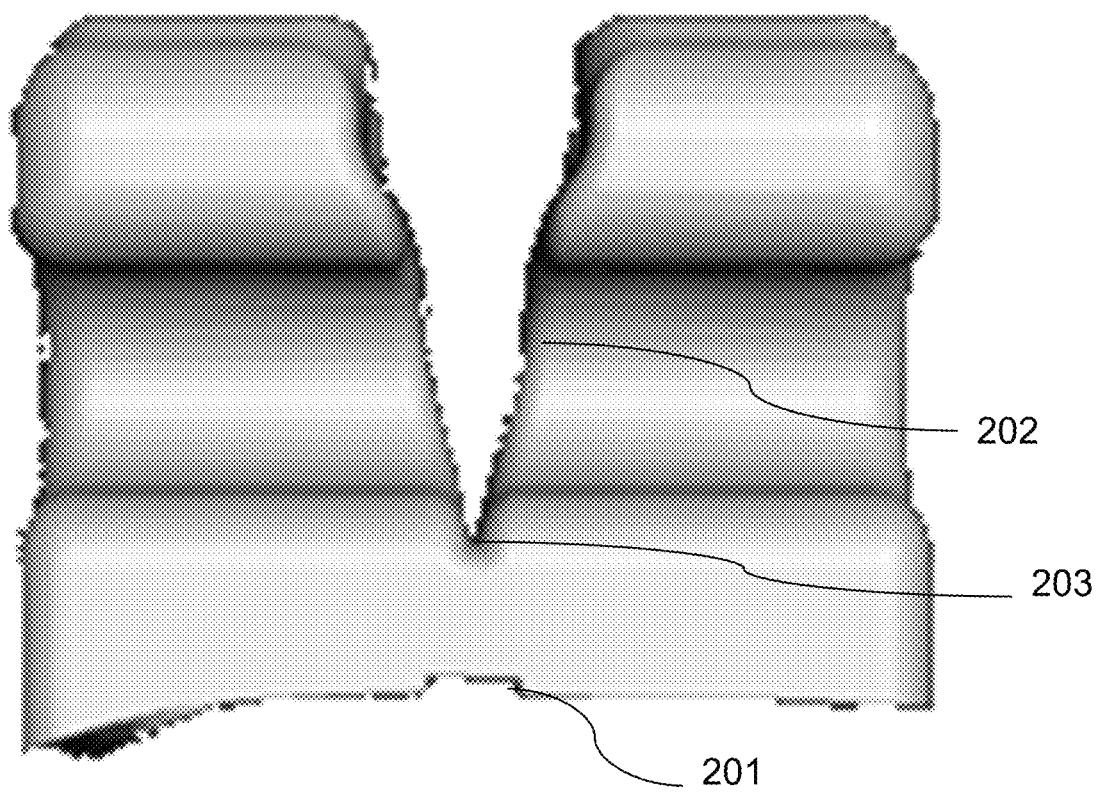
FIG. 3 is an exemplary illustration of an orthodontic bracket.
Figure 4:
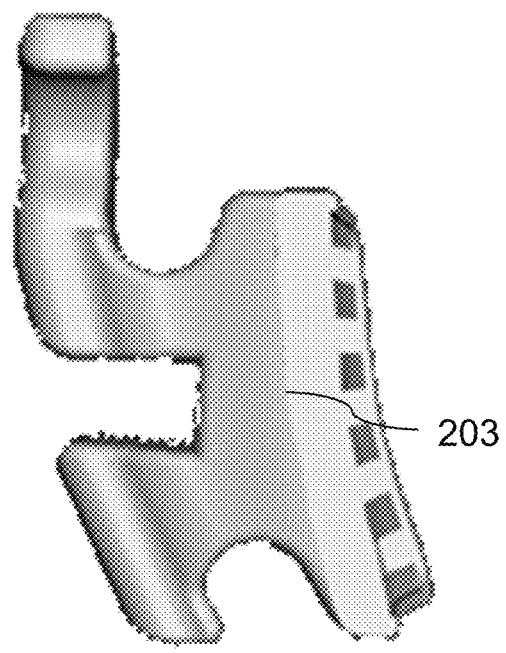
FIG. 4 is an exemplary illustration of an orthodontic bracket.

An embodiment of an orthodontic bracket 200 is shown in FIG. 2a. Bracket 200 consists of 2 separate cuts made along the central line of the bracket running occlusal/gingivally, which will allow the bracket to reliably fracture and debond when mesial/distal pressure is applied. The first 201 is cut along the base, and consists of a custom contoured polygon that matches the tooth shape which is consistently cut to a depth of up to 0.3 mm from the tooth surface. This polygon has a width greater than 0.1 mm and up 75% of the bracket width. The second 202 is the stress concentrator cut from the front of the bracket. This shape comes to a peak in order to provide for consistent fracturing at the desired location. Depending on the specifics of the tooth morphology, the bracket prescription, and the desired strength, the cut 203, shown in FIG. 3, can be started anywhere from 0.1 mm to 1 mm from the tooth and extend the remainder of the bracket structure. This cut can have a final width which can range from 5% to 50% of the bracket width, as shown in FIG. 4. The curve 203 of the shape in the gingival/occlusal direction perfectly matches the curvature of the tooth along the same line. This shape is created by a combination of thickening and boolean operations based on the distance field of the tooth, and its relationship with the bracket. The specifics of the location and thickness of the shape are determined by calculating the in-out of the bracket, and using this value in algorithms determined through experimental testing in order to provide the optimal bracket strength.

This auxiliary slot/stress concentrator can be applied to a variety of orthodontic appliances such as brackets or attachments. Curved tie wing edges can be applied to increase structural integrity and manufacturability and the slope of auxiliary slot into fault line can be designed to decrease layer separation for high quality manufacturability. A channel in the base can also be curved to the shape of the tooth and act as a stress concentrator point as well as an egress channel for excess bonding material.

The algorithm could be altered to allow a different force value based on a doctor's preference or if the force value is too high or low for a given patient population. Adolescents often do not follow best practices for orthodontic treatment, in which case a higher debond force value could be used to ensure brackets do not debond early due to abnormal mastication forces, i.e. biting on a pen. In cases where adults may not have these issues and orthodontists may prefer to not have to use a higher force to debond the feature would not have to be tuned.

The benefit of this invention is the improvement of consistency in the debonding force for customized brackets. Both brackets (LFO and 3M) which currently utilize a version of a stress concentrator mechanism use a singular, though different, shape for the stress concentrator, regardless of the tooth morphology. Due to the variety of bracket shapes provided by LFO's customization, a singular shape results in variation in the bracket breaking force. By linking the shape of the stress concentrator to the shape of the tooth, and controlling the depth of this stress concentrator by the thickness of the bracket, a more reliable breaking force can be achieved. This improved breaking force consistency allows for a more positive experience, particularly when debonding a sequence of brackets all at once. Additionally, it allows for improved tuning of the exact strength if it is found that the currently set strength is too low or high.

Variations of the invention consist of alternate shapes for the stress concentrator itself, as well as changing the direction of the stress concentrator. The shape of the channel 202 could also be altered while remaining custom contoured to provide different force profiles, to avoid food traps and increase cleanliness, or to strengthen the structural integrity of the bracket i.e. stronger tie wings. Another improvement area would be adjusting the design to allow orthodontists to debond brackets with a standard utility plier (aka Weingart or Howe pliers) or novel specialty plier while the wire is still engaged. This would ensure patients do not accidentally swallow brackets during debond and would highly increase the efficiency of the debonding process. In this scenario the algorithm, shape of the channel, as well as the location of the channel could be adjusted.

This improved stress concentrator uses a profile with a peak, however, circular, rectangular, or another other closed shape may be used as the profile for the stress concentrator. Additional shapes may be useful in tuning the exact strength of the bracket, as well as providing easier pathways for manufacturing.

By varying the tie-wing and slot designs, the same feature could conceivably be created traveling in the mesial/distal direction, or on a diagonal between the two directions. Altering this direction could reduce the risk of bracket debonding when using high force attachments such as 3M Forsus springs or other orthodontic functional or class II/III "bite correctors".

Figure 5:
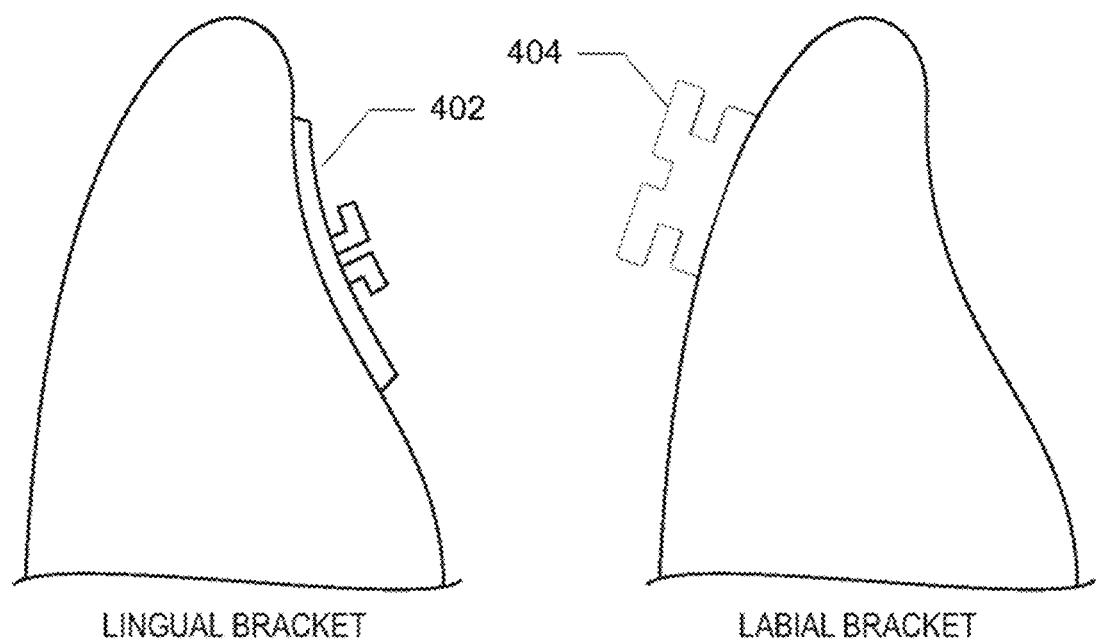
FIG. 5 is an exemplary illustration of bracket attached to a tooth.

The bracket pad, which holds or connects the bracket to the tooth surface, may be designed specifically according to the tooth surface profile, instead of a generalized gridding pattern. The customized brackets can meet individual case demand, such as increased anterior labial crown torque required in certain types of cases. For example, as shown in FIG. 5, the curve on tooth surface and the designed bracket, the tooth side of the bracket (bracket pad) is matched to the lingual or labial surface of the tooth, for example for lingual bracket 402 and labial bracket 404.

Figure 6:
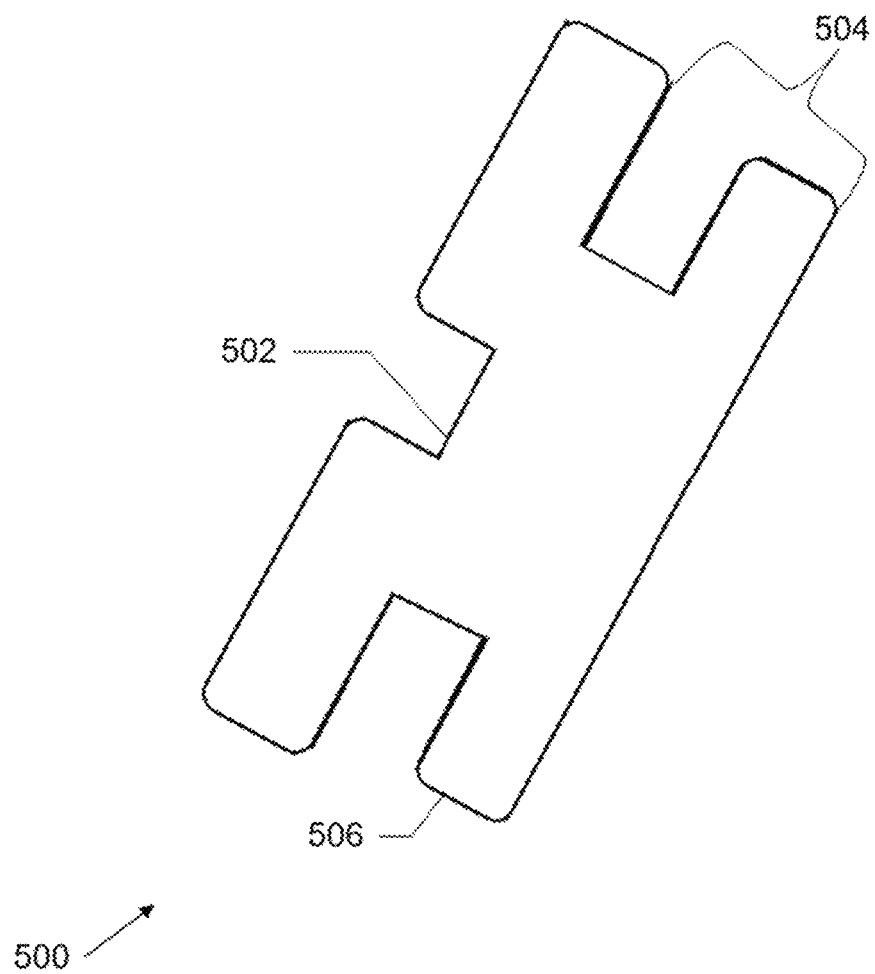
FIG. 6 is an exemplary illustration of a side view of an exemplary printed bracket.

A side view of an exemplary printed bracket 600 is shown in FIG. 6. The slot 502 on the bracket may have high accuracy in size, shape, and angler, and may have low thickness and is designed to accommodate a rectangular wire when completely filled. Slot 502 may be manufactured to any desired size and shape, but typically, slot 502 is manufactured with a greater depth than height or width. The base 504 of the bracket may have different height because of the selected material or desired orthodontic result. Likewise, the pad 506 of the bracket may highly match the tooth surface and maximize the tooth contact surface. This may allow for more accurate bracket placement by the clinician and better bond approximation to the tooth. Also, because each slot has its own position and shape to cooperate with the archwire, twisting error may be minimized and improved orthodontic result may be actualized. In a number of embodiments, these features may be manufactured as one piece and that the customization of the slot relative to the tooth may be a function of the slot changing position or the bracket base moving. In many embodiments, no machining of the features is required to produce a suitable bracket.

Using the ceramic slurry-based AM technique can turn the designed model into a ceramic product rapidly. The bracket manufacturing involves few steps and can be done on site, saving time and cost.

The described techniques may be used to manufacture brackets from consisting of high strength oxides, nitrides and carbides ceramics including but not limited to: Aluminum Oxide (Al2O3), Zirconium Oxide (ZrO2), Alumina-toughened Zirconia (ATZ), Zirconia-toughened alumina (ZTA), Lithium Disilicate, Leucite Silica or Silicon Nitride.

The described techniques may be used to attain a true straight wire appliance where bracket placement accuracy is improved, thus reducing treatment time and error; or may also be used in conjunction with a custom-bent arch wire to achieve ideal results.

Patients currently pay higher fees for white-colored ceramic brackets over metal due to their increased esthetics. For example, many patients desire a bracket that matches the color of the tooth to which the bracket is attached. This may cause the bracket to be less visible and provide improved appearance. As another example, embodiments of the present invention may provide the capability to produce clear brackets, which may provide still improved appearance.

Additionally, embodiments of the present invention may provide the capability to produce brackets in almost any color desired or selected, for example, in bright colors for use in children and some adults. Likewise, embodiments of the present invention may provide the capability to produce brackets having visible shapes that are not dictated by function, such as in the shape of animals, vehicles, toys, etc., for example, for use in children and some adults.

The described techniques may be made cost-effective to the point where an individual orthodontic practice could purchase the required equipment and software. This would provide the capability to simplify their bracket inventory instead of stocking brackets of different prescriptions.

Digital light processing (lithography-based) of ceramics has many advantages for orthodontic bracket fabrication, in comparison to selective laser sintering/melting (SLM) which uses thermal energy, and 3-D printing (3DP) systems that use a binder and polymer-derived ceramics (PDCs). For example, DLP may provide higher surface quality, better object resolution, and improved mechanical properties. PDCs structured using light in a stereolithographic or mask exposure process may also be used as a ceramic AM method for bracket fabrication.

The procedure for the layering additive manufacturing (AM) methodology of the labial/lingual orthodontic brackets by lithography-based DLP (e.g. U.S. Pat. No. 8,623,264 B2) is as follows.

An example of a lithography-based DLP process is described in U.S. Pat. No. 8,623,264 B2, which is incorporated herein by reference, but may be briefly summarized as follows: a light-polymerizable material, the material being located in at least one trough, having a particularly light-transmissive, horizontal bottom, is polymerized by illumination on at least one horizontal platform, the platform having a pre-specified geometry and projecting into a trough, in an illumination field, wherein the platform is displaced vertically to form a subsequent layer, light-polymerizable material is then added to the most recently formed layer, and repetition of the foregoing steps leads to the layered construction of the orthodontic bracket in the desired prescription/mold, which arises from the succession of layer geometries determined from the CAD software. The trough can be shifted horizontally to a supply position, and the supply device brings light-polymerizable material at least to an illumination field of the trough bottom, before the at least one trough is shifted to an illumination position in which the illumination field is located below the platform and above the illumination unit, and illumination is carried out, creating a "green bracket".

The light-polymerizable material or photo-reactive suspension (slurry) can be prepared based on commercially available di- and mono-functional methacrylates. An example material might be a slurry blend of about 0.01-0.025 wt % of a highly reactive photoinitiator, about 0.05-6 wt % a dispersant, an absorber, and about 2-20 wt % of a non-reactive diluent. A solid loading of high strength Oxide ceramics such as Aluminum Oxide ($Al_2O_3$) and Zirconium Oxide ($ZrO_2$) powder can be used, but this process may extend to other ceramic materials.

Figure 7:
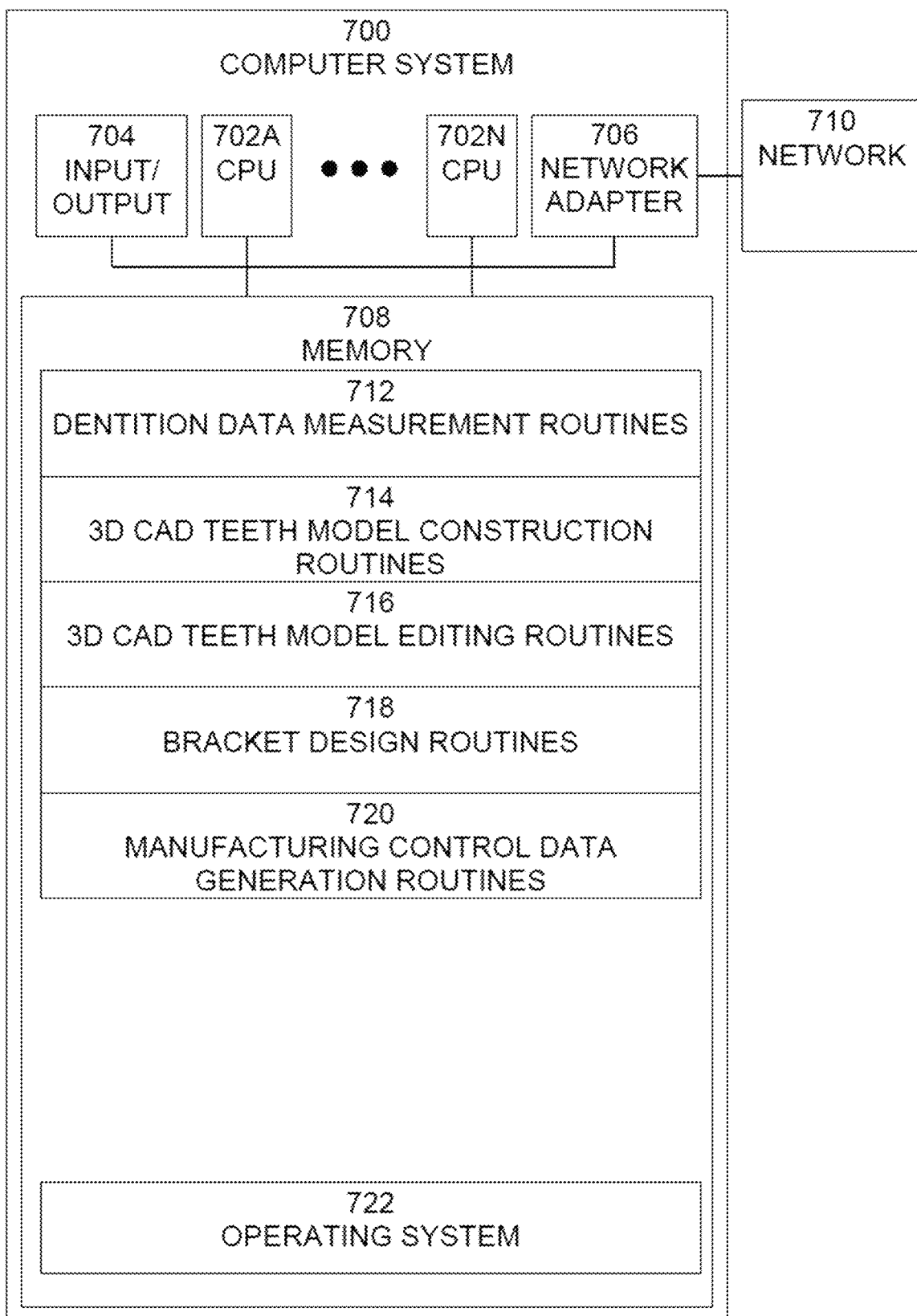
FIG. 7 is an exemplary block diagram of a computer system in which embodiments may be implemented.

An exemplary block diagram of a computer system 700, in which the processes shown above may be implemented, is shown in FIG. 7. Computer system 700 is typically a programmed general-purpose computer system, such as a personal computer, workstation, server system, and minicomputer or mainframe computer. Computer system 700 includes one or more processors (CPUs) 702A-702N, input/output circuitry 704, network adapter 706, and memory 708. CPUs 702A-702N execute program instructions in order to carry out the functions of embodiments of the present invention. Typically, CPUs 702A-702N are one or more microprocessors, such as an INTEL PENTIUM® processor. FIG. 7 illustrates an embodiment in which computer system 700 is implemented as a single multi-processor computer system, in which multiple processors 702A-702N share system resources, such as memory 708, input/output circuitry 704, and network adapter 706. However, the present invention also contemplates embodiments in which computer system 700 is implemented as a plurality of networked computer systems, which may be single-processor computer systems, multi-processor computer systems, or a mix thereof.

Input/output circuitry 704 provides the capability to input data to, or output data from, computer system 700. For example, input/output circuitry may include input devices, such as keyboards, mice, touchpads, trackballs, scanners, etc., output devices, such as video adapters, monitors, printers, etc., and input/output devices, such as, modems, etc. Network adapter 706 interfaces device 700 with a network 710. Network 710 may be any public or proprietary LAN or WAN, including, but not limited to the Internet.

Memory 708 stores program instructions that are executed by, and data that are used and processed by, CPU 702 to perform the functions of computer system 700. Memory 708 may include, for example, electronic memory devices, such as random-access memory (RAM), read-only memory (ROM), programmable read-only memory (PROM), electrically erasable programmable read-only memory (EE-PROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 708 varies depending upon the function that computer system 700 is programmed to perform. In the example shown in FIG. 7, memory contents that may be included in a system in which a content analysis platform is implemented are shown. However, one of skill in the art would recognize that these functions, along with the memory contents related to those functions, may be included on one system, or may be distributed among a plurality of systems, based on well-known engineering considerations. Embodiments of the present invention contemplate any and all such arrangements.

In the example shown in FIG. 7, memory 708 may include dentition data measurement routines 712, 3D CAD teeth model construction routines 714, 3D CAD teeth model editing routines 716, bracket design routines 718, manufacturing control data generation routines 720, and operating system 722. Dentition data measurement routines 712 may obtain and process dentition data, such as may be generated by CT layer scanning or a non-contact 3D scanner directly on the patient's teeth, or uses 3D readings on the teeth model previously cast. 3D CAD teeth model construction routines 714 may construct a 3D CAD model of the measured teeth based on the dentition data. 3D CAD teeth model editing routines 716 may be used to re-arrange the teeth in the model to the desired treatment outcomes and may additionally be used to accept additional information, such as the desired torque, offset, angulation of select brackets and occlusal/incisal coverage for placement guide. Bracket design routines 718 may be used to design and generate a 3D CAD model based on the input 3D CAD model of the measured teeth, the model of the desired treatment outcomes, and the input additional information. Manufacturing control data generation routines 720 may be used to generate manufacturing control data for use by the production equipment. Operating system 722 provides overall system functionality.

It is to be noted that additional functionality may be implemented in end user devices, such as end user devices 104 shown in FIG. 1. End user systems may be computer systems having a structure similar to that shown in FIG. 7. Such end user systems may include geometric analysis routines to perform geometric analysis of a location of an advertisement or content, such as may be performed by step 302 of FIG. 3. Likewise, such end user systems may include resource-based analysis routines to determine whether a computer is optimizing an advertisement or content for display on the screen, such as may be performed by step 302 of FIG. 3.

As shown in FIG. 7, an embodiment of the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

Figure 8:
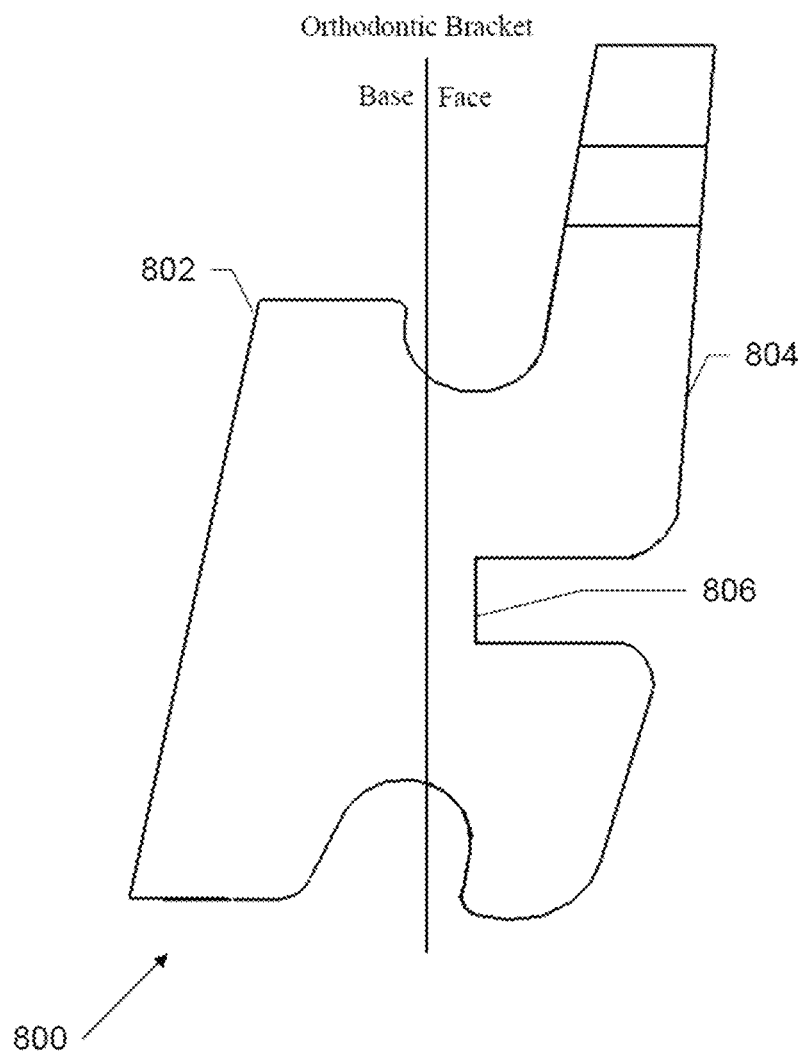
FIG. 8 is an exemplary illustration of an orthodontic bracket.

An example of an orthodontic bracket 800 is shown in FIG. 8. In this example, the base 802 of the bracket is shown to the left and the face 804 of the bracket is shown to the right. Base 802 is the portion that comes into contact with the tooth, and face 804 includes slot 806, which in embodiments may be a mesial-distal slot adapted to receive an archwire for applying force to a tooth.

Figure 10:
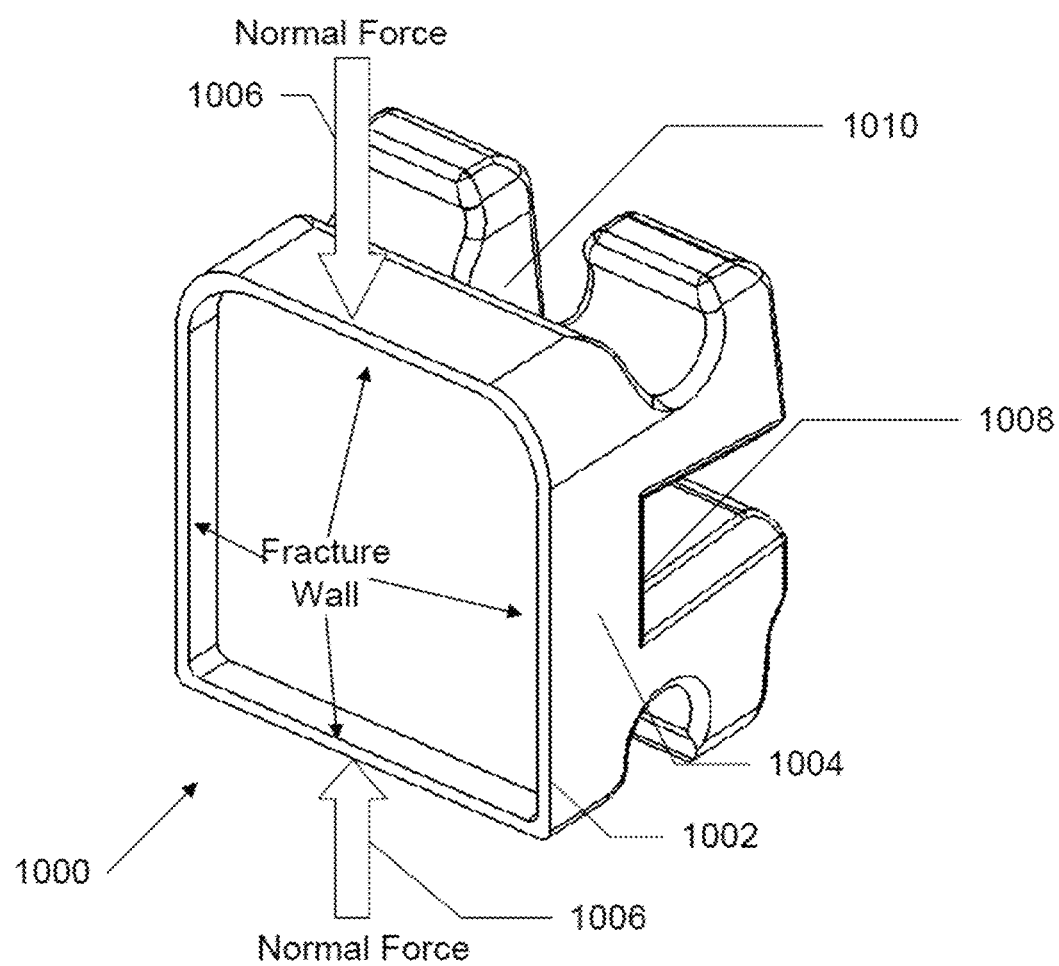
FIG. 10 is an exemplary illustration of an orthodontic bracket.

An example of an orthodontic bracket 1000 is shown in FIG. 10. In this example, a fracture wall 1002 may be manufactured around the perimeter of the base 1004 of bracket 1000. In embodiments, fracture wall 1002 may have a consistent thickness, which may be in a range of 15-140 μm, inclusive. In embodiments, fracture wall 1002 may have a varying thickness, which may be in a range of 15-140 μm, inclusive. In embodiments, bonding cement may be inserted into the cavity formed by fracture wall 1002. In embodiments, the wall thickness may be consistent around all edges of bracket 1000, enabling a normal force 1006 (the component of the contact force that is perpendicular to the surface of fracture wall 1002) to be applied in any direction, such as mesial-distal, occlusal-gingival, or to any opposite corners. The continuity of fracture wall 1002 around the entire bracket may provide predictable fracture of the wall via pliers, enabling debonding of the bracket though a combination of tensile and peeling forces, which is typically less than the shear bond strength of a bonded bracket. For example, pliers may be used that may, moving around the ligated wire, induce a mesial-distal force 1006 on the labial portion of the bracket. In embodiments, such force may be in range of 10-180 Newtons, inclusive. Also shown in this example are slot 1008 (archwire/mesial-distal slot) and auxiliary slot 1010.

Figure 11:
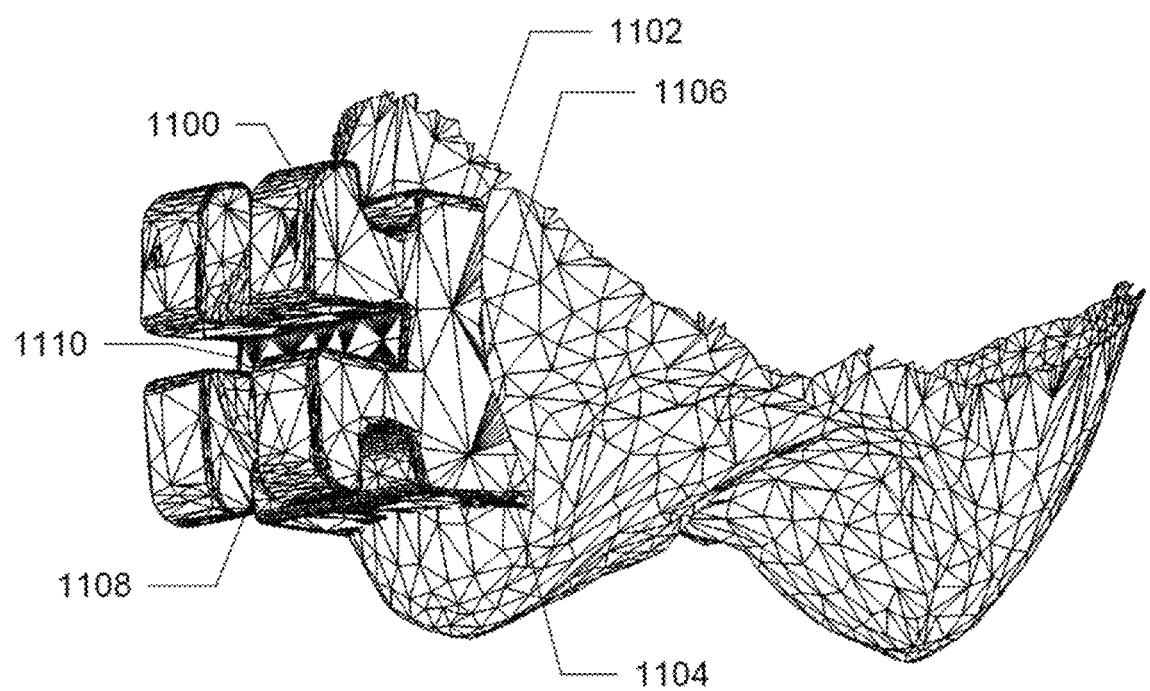
FIG. 11 is an exemplary illustration of an orthodontic bracket.

An example of an orthodontic bracket 1100 bonded to a tooth 1102 is shown in FIG. 11. This example depicts a bracket 1100 having a base surface 1102 that is contoured 1104 to the shape of tooth 1102, such as along a bracket/tooth interface 1106. The contouring 1104 may be configured to match the desired position of bracket 1100 on the tooth. Any changes in positioning of the bracket may require changes in contouring 1104. Base 1102 may be contoured to the tooth while the bracket face 1108 and slot 1110 may be aligned to a pre-prescribed location that includes variables typically accounted for in an orthodontic bracket prescription, including, for example 1) in/out and offset, 2) tip and 3) torque. For example, an in/out position and offset may involve bracket thickness and offset relative to a tooth along bracket/tooth interface 1106. A tip parameter may involve an angulation of slot 1110 along a mesio-distal direction. A torque parameter may involve an inclination of slot 1110 and/or base 1102 relative to a tooth surface so that torque may be applied by an archwire.

Figure 12:
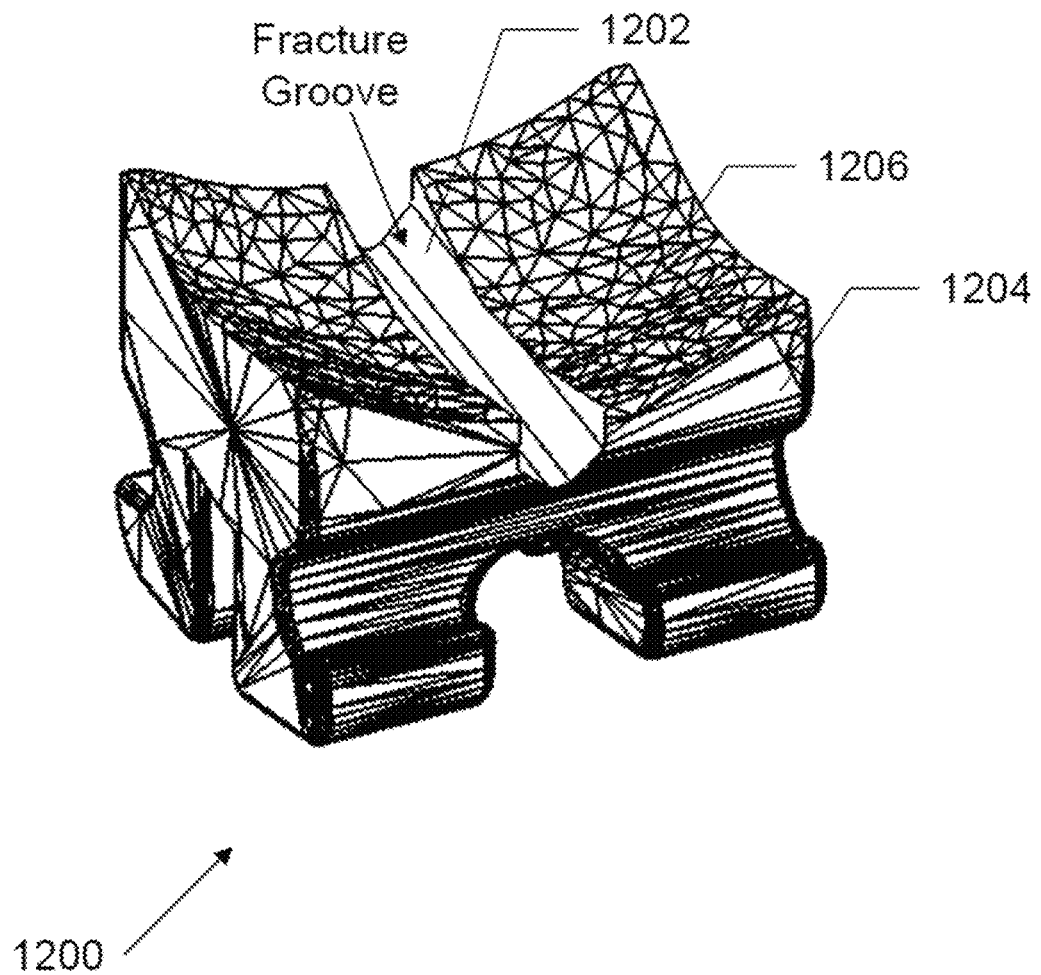
FIG. 12 is an exemplary illustration of an orthodontic bracket.

An example of an orthodontic bracket 1200 is shown in FIG. 12. In this example, a fracture groove 1202 may be manufactured within the middle vertical third of ceramic bracket 1200, as viewed from the base 1204 of bracket 1200. Contoured portion 1206 of base 1204 is also shown.

Figure 13:
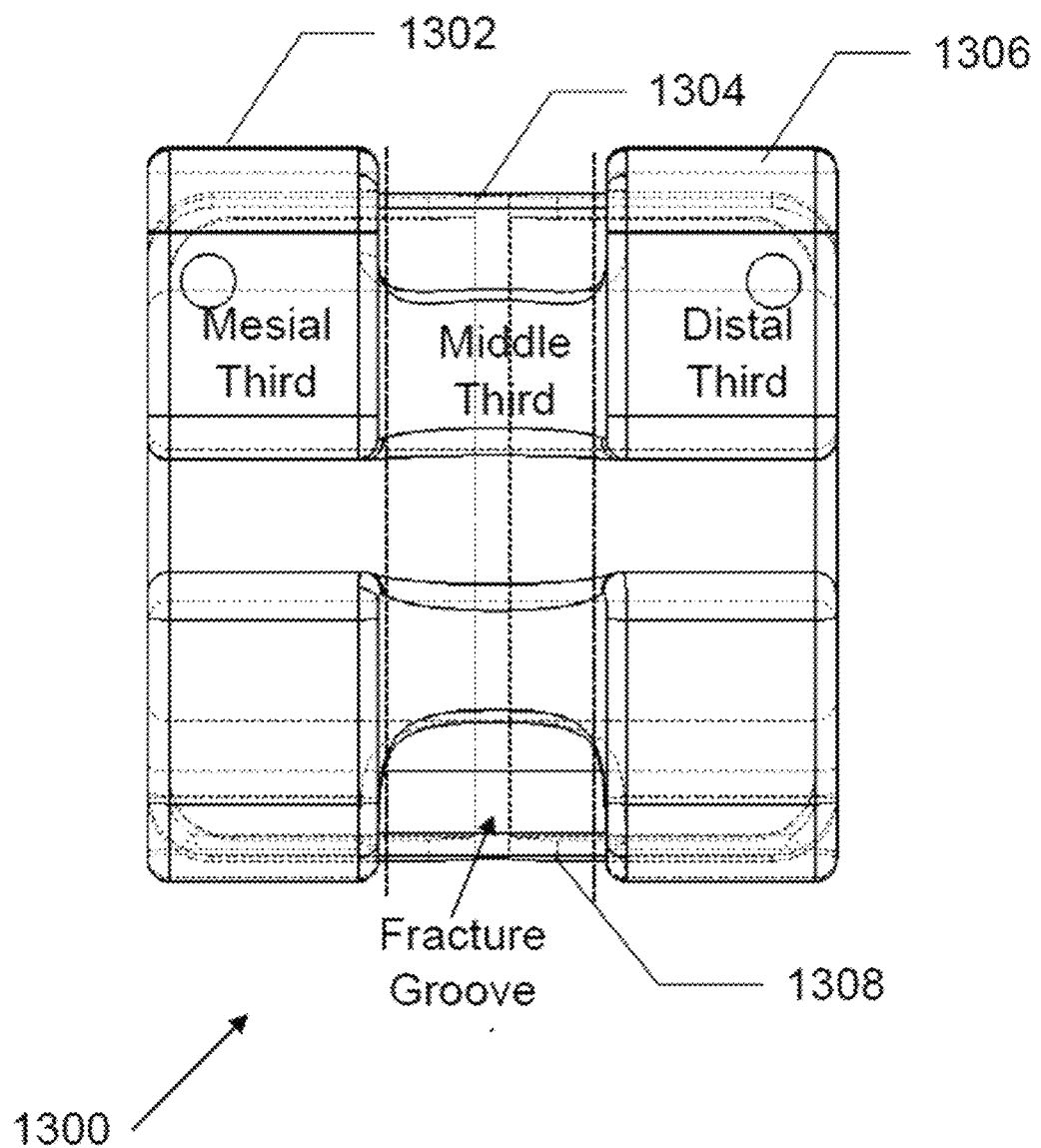
FIG. 13 is an exemplary illustration of an orthodontic bracket.

An example of an orthodontic bracket 1300 is shown in FIG. 13, as viewed from the base of bracket 1300. In this example, the mesial third 1302, the middle third 1304, and the distal third 1306, of bracket 1300, are indicated. A fracture groove 1308 may be manufactured within the middle vertical third 1304 on the tooth-contacting side of the ceramic bracket 1300.

Figure 14:
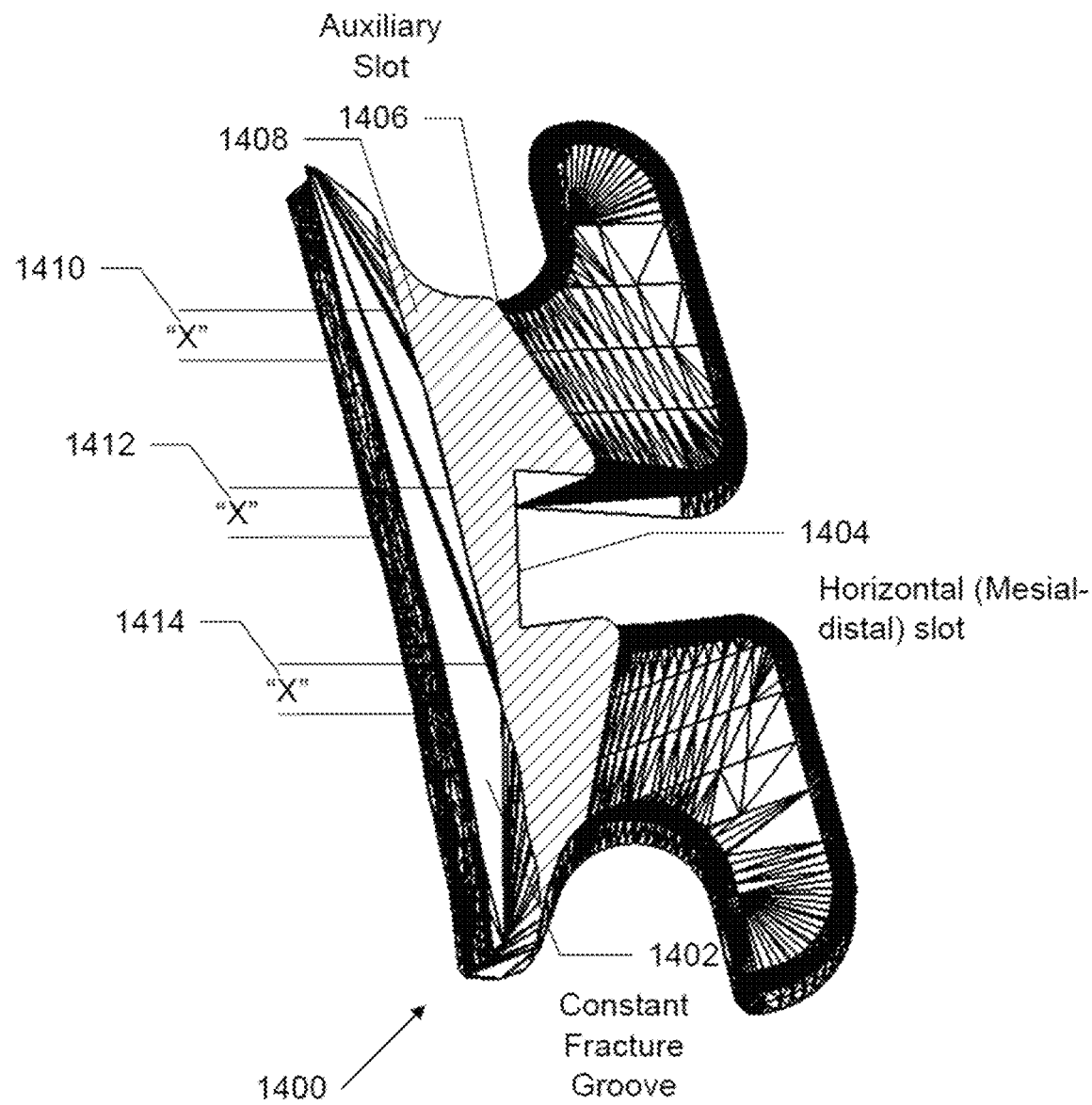
FIG. 14 is an exemplary illustration of an orthodontic bracket.

An example of an orthodontic bracket 1400 is shown in FIG. 14, in a cross-sectional view. In the example shown in FIG. 14, a fracture groove 1402, horizontal (mesial-distal) slot 1404, and auxiliary slot 1406 are shown. Fracture groove 1402 may include a weakened area including a tooth curved depression (groove) in the bracket base 1408 running vertically (in the occlusal-gingival direction) within the middle third of bracket 1400. Fracture groove 1402 may match the contour of the tooth for that portion of the bracket positioning. Fracture groove 1402 may align with the vertical midline and/or deepest portion of auxiliary slot 1406. The bracket area between these features may form the weakened area of bracket 1400.

Finite-element analysis has revealed that mesial-distal forces on the side of the tie-wings results in a concentration of forces in the middle third of the bracket base. In embodiments, fracture groove 1402 may be defined as an area of removed material from where such forces would have been most concentrated. The addition of fracture groove 1402 lowers the forces required to predictably create a bracket fracture down the middle vertical third of the bracket, which aids in debonding the ceramic bracket from the tooth. The weakened area and the fracture force can be optimized by adjusting the dimensions of the groove and/or the auxiliary slot.

In embodiments, fracture groove 1402 may be constant in depth from the tooth surface, as shown in FIG. 14. In embodiments, constant depth fracture groove 1402 may be a nominal or predetermined depth for some or all brackets for a patient. For example, groove depths 1410, 1412, and 1414 may all be the same predetermined depth "X". Such nominal or predetermined depth may be in a range of, for example, 0.10 mm to 1.2 mm, inclusive. In embodiments, constant depth fracture groove 1402 may be a depth that is different for some or for each bracket. For example, a distance from the tooth surface to the deepest part of fracture groove 1402 may differ for different brackets.

Figure 9:
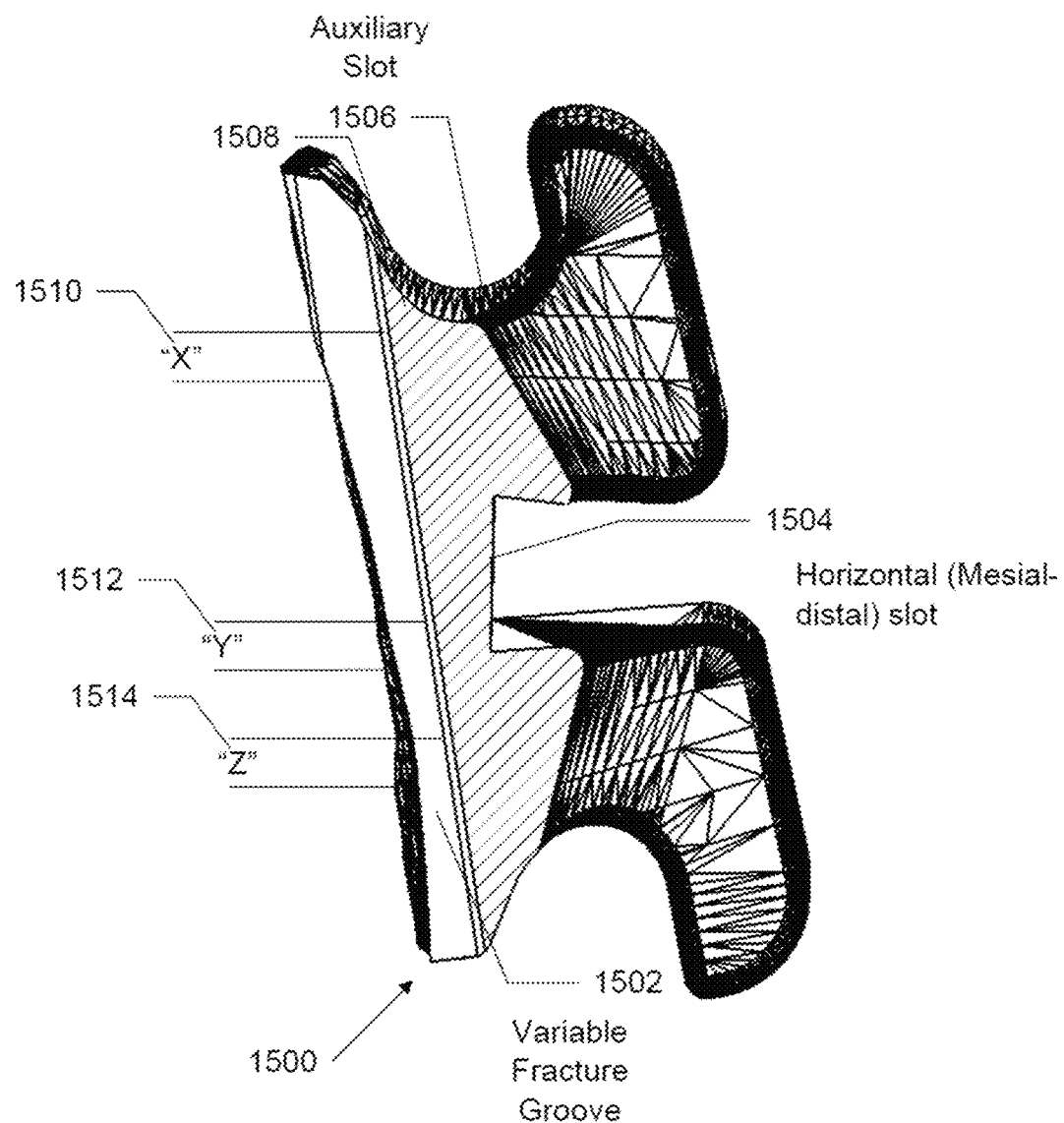
FIG. 9 is an exemplary illustration of an orthodontic bracket.

An example of an orthodontic bracket 1500 is shown in FIG. 9, in a cross-sectional view. In embodiments, fracture groove 1502 may be variable in depth from the tooth surface, as shown in FIG. 15. In embodiments in which fracture groove 1502 is variable, the variance may have a range of 1-50%, inclusive, of the distance from the tooth surface to the deepest part of fracture groove. For example, groove depth 1510 may be depth "X", groove depth 1512 may be depth "Y", and groove depth 1514 may be depth "Z". In embodiments, variable depth fracture groove 1502 may have a nominal or predetermined maximum depth for some or all brackets for a patient. Such as nominal or predetermined maximum depth may be in a range of, for example, 0.10 mm to 1.2 mm, inclusive. In embodiments, constant depth fracture groove 1502 may have a maximum depth that is different for some or for each bracket. For example, a distance from the tooth surface to the deepest part of fracture groove 1502 may differ for different brackets.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
using at least one processor:
generating a three-dimensional (3D) model of an orthodontic bracket based at least in part on a 3D model of one or more of a patient's teeth, wherein the orthodontic bracket is generated to be placed over a region of a first tooth of the patient's teeth, the orthodontic bracket comprising:
a mesial-distal slot configured to receive an archwire; and
a stress concentrator groove arranged along an occlusal-gingival direction within a facial side of the orthodontic bracket, wherein:
the stress concentrator groove comprises a geometric shape extending along the occlusal-gingival direction and in the facial side of the orthodontic bracket;
the stress concentrator groove comprises a depth between (a) the geometric shape extending along the occlusal-gingival direction and in the facial side of the orthodontic bracket and (b) a corresponding surface along the occlusal-gingival direction within a base of the orthodontic bracket; and
at least part of the geometric shape of the stress concentrator groove and a part of the corresponding surface along the base of the orthodontic bracket are contoured in the occlusal-gingival direction based on a surface curvature of the region of the first tooth over which the orthodontic bracket is to be placed so that the depth between the part of the geometric shape and the part of the corresponding surface is constant; and
manufacturing an orthodontic bracket based on the 3D model of the orthodontic bracket using an additive manufacturing device.

2. The method of claim 1, wherein the base of the orthodontic bracket comprises a notch groove arranged along the occlusal-gingival direction.

3. The method of claim 1, wherein the base of the orthodontic bracket is contoured based on the surface curvature of the region of the first tooth over which the orthodontic bracket is to be placed.

4. The method of claim 1, further comprising providing data related to the 3D model of the orthodontic bracket to the additive manufacturing device.

5. The method of claim 4, wherein the orthodontic bracket is produced by layer manufacturing from an inorganic material including at least one of a ceramic, a polymer-derived ceramic, and a polymer-derived metal.

6. The method of claim 1, wherein the stress concentrator groove gradually narrows from the facial side of the orthodontic bracket toward a base of the orthodontic bracket.

7. The method of claim 6, wherein the stress concentrator groove has a V-shaped cross-sectional shape.

8. The method of claim 6, wherein the geometric shape of the stress concentrator groove narrows to an interior surface, and wherein the interior surface is the at least part of the geometric shape of the stress concentrator groove that is contoured in the occlusal-gingival direction to match the surface curvature of the region of the first tooth over which the orthodontic bracket is to be placed.

9. A system comprising:
at least one processor; and
at least one computer-readable medium comprising instructions that, when executed by the at least one processor, perform a method comprising:
accessing a three-dimensional (3D) model of an orthodontic bracket generated based at least in part on a 3D model of one or more of a patient's teeth, wherein the orthodontic bracket was generated to be placed over a region of a first tooth of the patient's teeth, the orthodontic bracket comprising:
a mesial-distal slot configured to receive an archwire; and
a stress concentrator groove arranged along an occlusal-gingival direction within a facial side of the orthodontic bracket, wherein:
the stress concentrator groove comprises a geometric shape extending along the occlusal-gingival direction and in the facial side of the orthodontic bracket;
the stress concentrator groove comprises a depth between (a) the geometric shape extending along the occlusal-gingival direction and in the facial side of the orthodontic bracket and (b) a corresponding surface along the occlusal-gingival direction within a base of the orthodontic bracket; and at least part of the geometric shape of the stress concentrator groove and a part of the corresponding surface along the base of the orthodontic bracket are contoured in the occlusal-gingival direction based on a surface curvature of the region of the first tooth over which the orthodontic bracket is to be placed so that the depth between the part of the geometric shape and the part of the corresponding surface is constant; and manufacturing an orthodontic bracket based on the 3D model of the orthodontic bracket using an additive manufacturing device.

10. An orthodontic bracket configured to be placed over a region of a first tooth of a patient, the bracket fabricated by:

accessing a three-dimensional (3D) model of the orthodontic bracket based at least in part on a 3D model of one or more of a patient's teeth, the orthodontic bracket comprising:

a mesial-distal slot configured to receive an archwire; and a stress concentrator groove arranged along an occlusal-gingival direction within a facial side of the orthodontic bracket, wherein:

the stress concentrator groove comprises a geometric shape extending along the occlusal-gingival direction and in the facial side of the orthodontic bracket;

the stress concentrator groove comprises a depth between (a) the geometric shape extending along the occlusal-gingival direction and in the facial side of the orthodontic bracket and (b) a corresponding surface along the occlusal-gingival direction within a base of the orthodontic bracket; and at least part of the geometric shape of the stress concentrator groove and a part of the corresponding surface along the base of the orthodontic bracket are contoured in the occlusal-gingival direction based on a surface curvature of the region of the first tooth over which the orthodontic bracket is to be placed so that the depth between the part of the geometric shape and the part of the corresponding surface is constant; and producing, by an additive manufacturing machine, the orthodontic bracket according to data related to the 3D model of the orthodontic bracket, wherein the orthodontic bracket is produced by layer manufacturing from an inorganic material including at least one of a ceramic, a polymer-derived ceramic, and a polymer-derived metal.

11. The system of claim 9, wherein the base of the orthodontic bracket comprises a notch groove arranged along the occlusal-gingival direction.

12. The system of claim 9, wherein the base of the orthodontic bracket is contoured based on the surface curvature of the region of the first tooth over which the orthodontic bracket is to be placed.

13. The system of claim 9, wherein the stress concentrator groove gradually narrows from the facial side of the orthodontic bracket toward a base of the orthodontic bracket.

14. The system of claim 13, wherein the stress concentrator groove has a V-shaped cross-sectional shape.

15. The system of claim 13, wherein the geometric shape of the stress concentrator groove narrows to an interior surface, and wherein the interior surface is the at least part of the geometric shape of the stress concentrator groove that is contoured in the occlusal-gingival direction to match the surface curvature of the region of the first tooth over which the orthodontic bracket is to be placed.

16. The orthodontic bracket of claim 10, wherein the base of the orthodontic bracket comprises a notch groove arranged along the occlusal-gingival direction.

17. The orthodontic bracket of claim 10, wherein the base of the orthodontic bracket is contoured based on the surface curvature of the region of the first tooth over which the orthodontic bracket is to be placed.

18. The orthodontic bracket of claim 10, wherein the stress concentrator groove gradually narrows from the facial side of the orthodontic bracket toward a base of the orthodontic bracket.

19. The orthodontic bracket of claim 18, wherein the stress concentrator groove has a V-shaped cross-sectional shape.

20. The orthodontic bracket of claim 18, wherein the geometric shape of the stress concentrator groove narrows to an interior surface, and wherein the interior surface is the at least part of the geometric shape of the stress concentrator groove that is contoured in the occlusal-gingival direction to match the surface curvature of the region of the first tooth over which the orthodontic bracket is to be placed.

* * * * *